United States Patent
Ruck et al.

(10) Patent No.: US 11,901,803 B2
(45) Date of Patent: Feb. 13, 2024

(54) PASS GATE DRIVER

(71) Applicant: Texas Instruments Incorporated, Dallas, TX (US)

(72) Inventors: Bernhard Wolfgang Ruck, Freising (DE); Ruediger Kuhn, Freising (DE); Oliver Nehrig, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 50 days.

(21) Appl. No.: 17/560,756

(22) Filed: Dec. 23, 2021

(65) Prior Publication Data

US 2023/0208291 A1 Jun. 29, 2023

(51) Int. Cl.
*H02M 1/08* (2006.01)
*H02M 3/158* (2006.01)
*H02M 3/157* (2006.01)
*G05F 1/46* (2006.01)
*H02M 1/00* (2006.01)

(52) U.S. Cl.
CPC ............... *H02M 1/08* (2013.01); *G05F 1/46* (2013.01); *H02M 1/0029* (2021.05); *H02M 3/157* (2013.01); *H02M 3/1584* (2013.01)

(58) Field of Classification Search
CPC .......... H02M 1/08; H02M 1/0029; G05F 1/46
See application file for complete search history.

(56) References Cited

U.S. PATENT DOCUMENTS

2006/0119326 A1\* 6/2006 Jiang .................... H03K 17/164
323/222

\* cited by examiner

*Primary Examiner* — Alex Torres-Rivera
(74) *Attorney, Agent, or Firm* — Brian D. Graham; Frank D. Cimino

(57) ABSTRACT

A driver includes a low-resistance charging path between a supply voltage rail and a first output node, a high-resistance charging path between the supply voltage rail and the first output node, an inverter coupled to the first output node and configured to enable and disable the low-resistance charging path, and a high-resistance discharging path between the first output node and a second output node. The first output node is coupled to a control terminal of a pass gate transistor in some implementations. The low-resistance charging path charges a voltage on the first output node to a threshold voltage of the pass gate transistor, and the high-resistance charging path charges the voltage on the first output node greater than the threshold voltage of the pass gate transistor. The high-resistance discharging path discharges the voltage on the first output node.

16 Claims, 4 Drawing Sheets

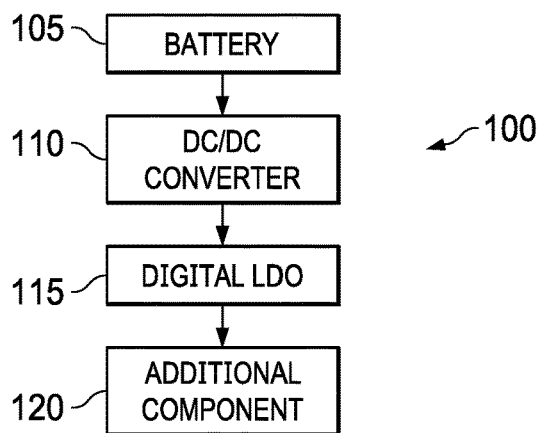
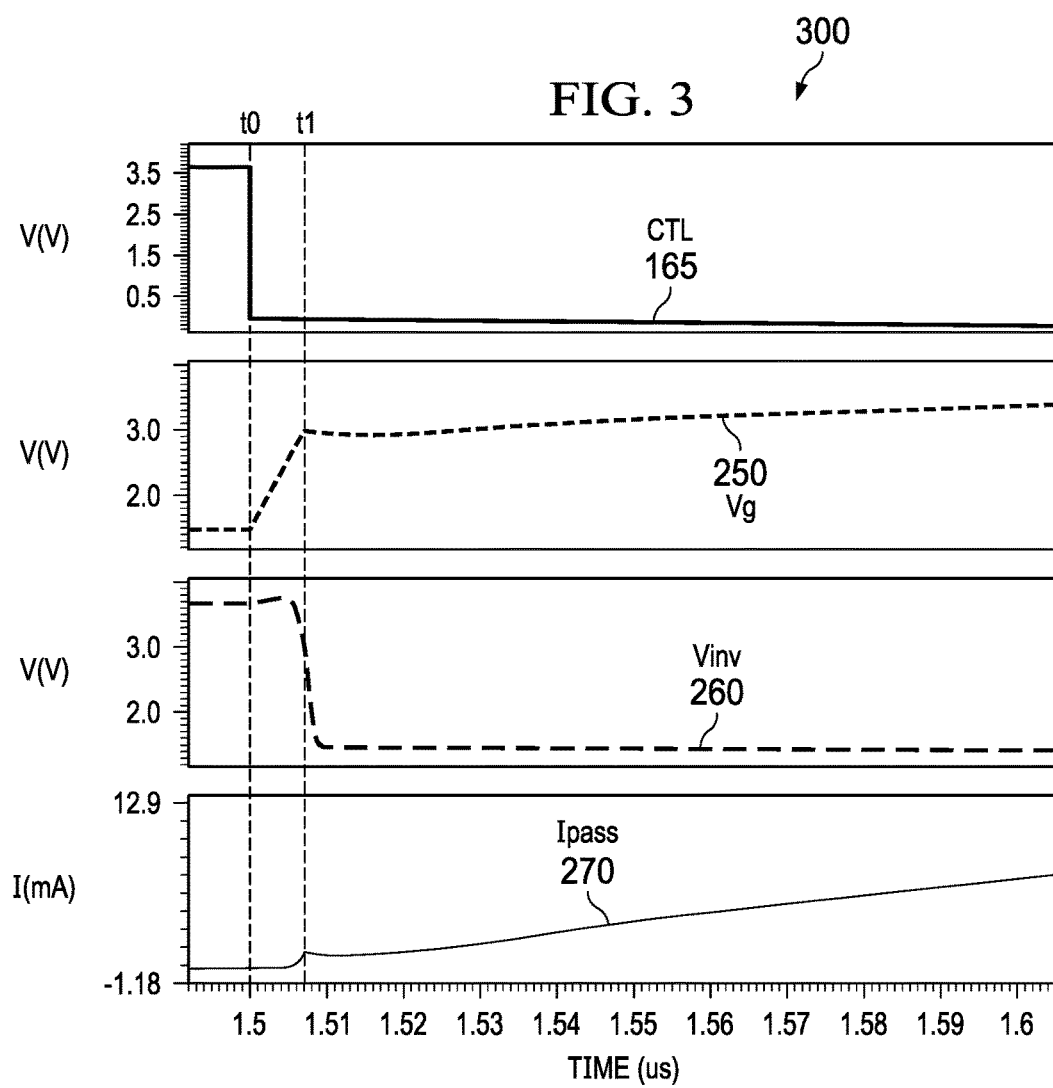

PASS GATE DRIVER

BACKGROUND

Digital low dropout (LDO) regulators include an array of pass gate switches driven by a series of drivers. The pass gate switches are turned on and off slowly with a shallow ramp in gate voltage to prevent strong transients in the current through the pass gate switches and the resulting ringing in the regulated output voltage due to parasitic inductance of the integrated circuit. However, the shallow ramp and slow turn-on time introduces a "dead time" while the gate-to-source voltage of a particular pass gate switch is charged from ground to a threshold voltage at which the transistor is significantly conductive, affecting the stability of the digital LDO regulator.

SUMMARY

A driver includes a low-resistance charging path between a supply voltage rail and a first output node, a high-resistance charging path between the supply voltage rail and the first output node, an inverter coupled to the first output node and configured to enable and disable the low-resistance charging path, and a high-resistance discharging path between the first output node and a second output node. The first output node is coupled to a control terminal of a pass gate transistor in some implementations. The low-resistance charging path charges a voltage on the first output node to a threshold voltage of the pass gate transistor, and the high-resistance charging path charges the voltage on the first output node greater than the threshold voltage of the pass gate transistor. The high-resistance discharging path discharges the voltage on the first output node.

In some implementations, the high-resistance discharging path comprises a first transistor and a second transistor. The first transistor has a first control terminal that receives a biasing voltage, a first current terminal coupled to the first output node, and a second current terminal. The second transistor has a second control terminal that receives a control signal, a third current terminal coupled to the second current terminal, and a fourth current terminal coupled to the second output node. A width-to-length ratio of the first transistor is less than one, in some implementations.

The inverter comprises a first transistor and a second transistor, in some implementations. The first transistor has a first control terminal coupled to the first output node, a first current terminal coupled to the supply voltage rail, and a second current terminal. The second transistor has a second control terminal coupled to the first output node, a third current terminal coupled to the second current terminal, and a fourth current terminal coupled to the second output node. The first output node is configured to be coupled to a control terminal of a pass gate transistor in some implementations, and characteristics of the second transistor are chosen to match characteristics of the pass gate transistor.

In some implementations, the inverter is a first inverter, and the low-resistance charging path includes three transistors and a second inverter. The first transistor has a first control terminal that receives a control signal, a first current terminal coupled to the supply voltage rail, and a second current terminal. The second transistor has a second control terminal, a third current terminal coupled to the second current terminal, and a fourth current terminal. The third transistor has a third control terminal that receives a biasing voltage, a fifth current terminal coupled to the fourth current terminal, and a sixth current terminal coupled to the first output node. The second inverter has an input coupled to an output of the first inverter and an output coupled to the second control terminal.

In some implementations, the high-resistance charging path comprises the first transistor of the low-resistance charging path and a fourth transistor. The fourth transistor has a fourth control terminal that receives the biasing voltage, a seventh current terminal coupled to the second current terminal, and an eighth current terminal coupled to the first output node. A width-to-length ratio of the fourth transistor is less than one, in some implementations.

BRIEF DESCRIPTION OF THE DRAWINGS

For a detailed description of various examples, reference will now be made to the accompanying drawings in which:

FIG. 1A shows an example system using a digital low dropout regulator.

FIG. 3 shows waveforms of signals in the pass gate driver shown in FIG. 2.

The same reference number is used in the drawings for the same or similar (either by function and/or structure) features.

DETAILED DESCRIPTION

Figure 1B:
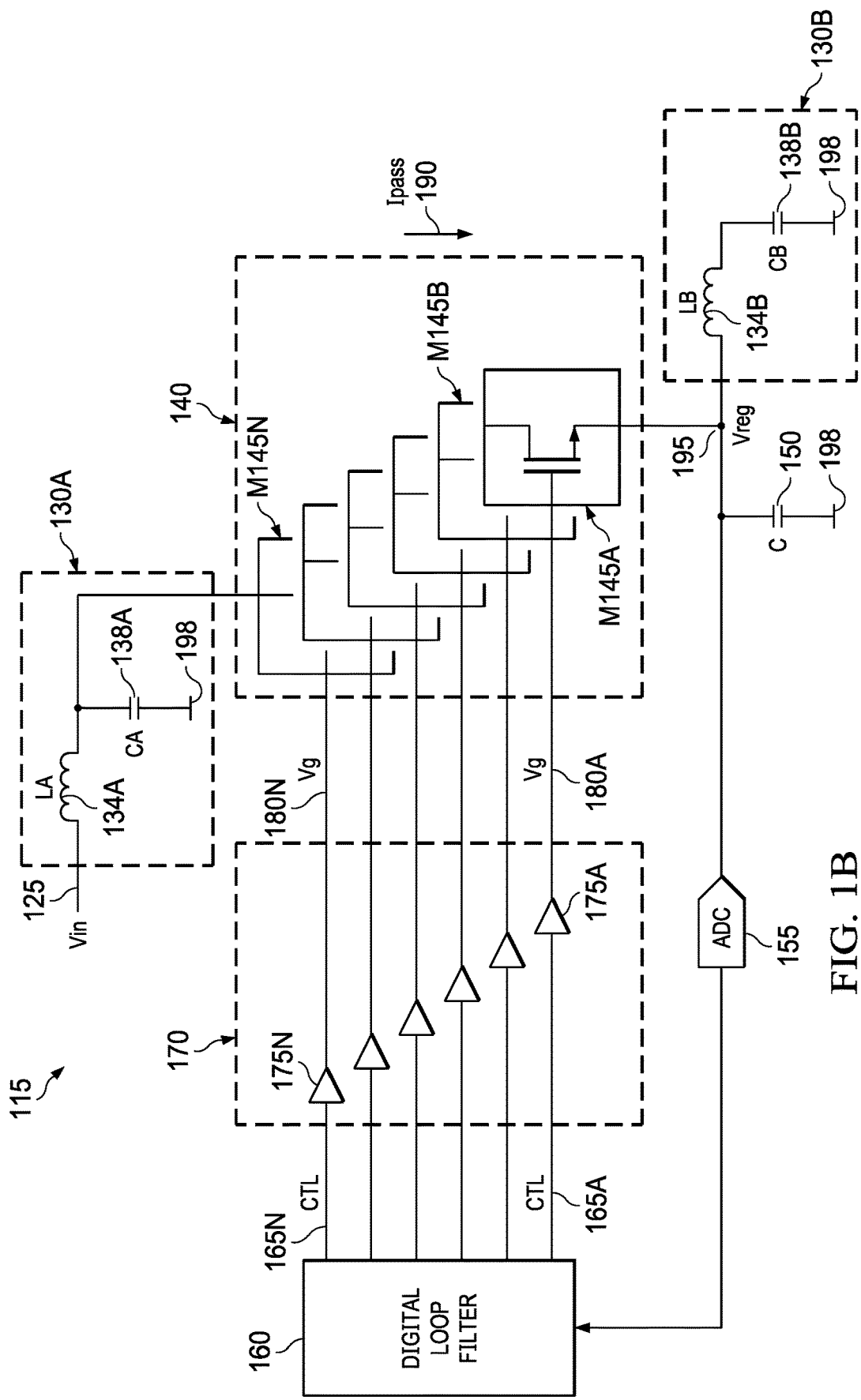
FIG. 1B shows the digital low dropout regulator in the system shown in FIG. 1A.

The described driver circuits enable fast turn on and a slow slew rate to reduce transients in current through pass gate switches driven by the driver circuits. A driver circuit comprises six transistors and two inverters. The first transistor is coupled to a supply voltage rail and has a first control terminal configured to receive a control signal. The second transistor is coupled between the first transistor and a first output node configured to be coupled to a control terminal of the pass gate switch and has a second control terminal configured to receive a first biasing voltage, such that it remains turned on. The first and second transistors form a high-resistance charging path for a voltage on the first output node.

The third transistor is coupled to the first output node and has a third control terminal configured to receive a second biasing voltage, such that it remains turned on. The fourth transistor is coupled between the third transistor and a second output node and has a fourth control terminal configured to receive the control signal. The third and fourth transistors form a high-resistance discharging path for the voltage on the first output node.

The fifth transistor is coupled to the first and second transistors and has a fifth control terminal. The sixth transistor is coupled between the fifth transistor and the first output node and has a sixth control terminal configured to receive the first biasing voltage, such that it remains turned on. The first, fifth, and sixth transistors form a low-resistance charging path for the voltage on the first output node.

The first inverter includes the seventh and eighth transistors. The seventh transistor is coupled to the supply voltage rail and has a seventh control terminal coupled to the first output node. The eighth transistor is coupled between the seventh transistor and the second output node and has an eighth control terminal coupled to the first output node. The second inverter is coupled to an output of the first inverter and to the fifth control terminal.

FIG. 1A shows an example system 100 using a digital low dropout (LDO) regulator 115. The system 100 includes a battery 105, a DC/DC converter 110, the digital LDO regulator 115, and an additional component 120 (e.g., a load). The DC/DC converter 110 converts the power stored in the battery 105 into a voltage which is provided to the digital LDO regulator 115. The digital LDO regulator 115 generates a regulated output voltage that is independent of load impedance, variations in the input voltage from the DC/DC converter 110, temperature, and the like. The additional component 120 may include an image sensor, a processor, a controller, and/or other component that relies on a stable supply voltage, which it receives from the digital LDO regulator 115.

FIG. 1B shows an example digital low dropout (LDO) regulator 115, which includes a pass gate switch array 140, a capacitor C 150, an analog-to-digital converter (ADC) 155, a digital loop filter 160, and a pass gate driver 170. The pass gate switch array 140 includes a number N of transistors M 145A-N, which may be metal oxide semiconductor field-effect transistors (MOSFETs). Accordingly, M 145A-N are n-type MOSFETS (NMOS) in an example. In other examples, one or more of M 145A-N are PMOS or bipolar junction transistors (BJTs). A BJT includes a base corresponding to the gate terminal, and a collector and an emitter corresponding to the drain and source terminals of a MOSFET. The base of a BJT and the gate terminal of a MOSFET are also called control inputs. The collector and emitter of a BJT and the drain and source terminals of a MOSFET are also called current terminals.

The drain terminals of M 145A-N are coupled to an input voltage node Vin 125 via on-chip decoupling 130A, which is represented as inductor LA 134A and capacitor CA 138A. The inductor LA 134A is coupled between the input voltage node Vin 125 and the drain terminals of M 145A-N, and the capacitor CA 138A is coupled between the inductor LA 134A and the drain terminals of M 145A-N and to ground 198. The source terminals of M 145A-N are coupled to a regulated output voltage node Vreg 195. The gate terminals of M 145A-N are coupled to corresponding drivers 175A-N in the pass gate driver 170 and configured to receive corresponding gate voltages Vg 180A-N.

The regulated output voltage node Vreg 195 is provided to other components in the integrated circuit including the LDO regulator 115 via on-chip decoupling 130B, which is represented as inductor LB 134B and capacitor CB 138B. The inductor LB 134B is coupled in series with the capacitor CB 138B, which is further coupled to ground 198. The capacitor C 150 is coupled between Vreg 195 and ground 198. The ADC 155 has an input coupled to Vreg 195 and an output coupled to the digital loop filter 160, which generates a number N of control signals CTL 165A-N for the gate drivers 175A-N.

The switches M 145A-N in the pass gate switch array 140 are turned on and off slowly with a shallow ramp in the gate voltages Vg 180A-N, which prevents strong transients in the current Ipass 190 through the switches M 145A-N and ringing in the regulated output voltage Vreg 195 due to parasitic inductance of the on-chip couplings 130A-B. However, a slow slew rate adds an amount of "dead time" while the gate-to-source voltage of a particular transistor is charged from ground to a threshold voltage at which the transistor is significantly conductive, affecting the stability of the digital LDO 115.

Figure 2:
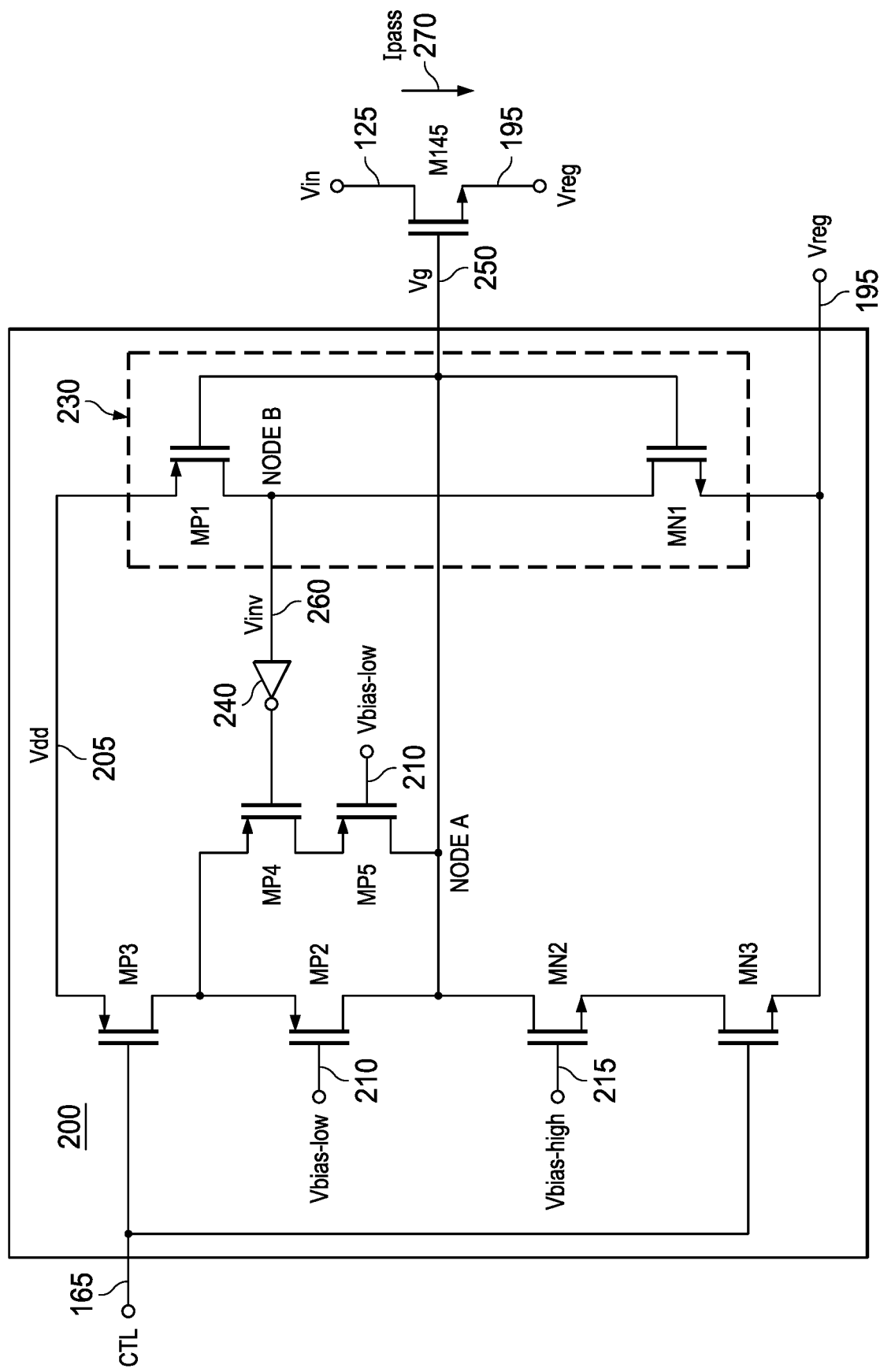
FIG. 2 shows an example pass gate driver with slew rate control.

FIG. 2 shows an example pass gate driver 200 (e.g., any of gate drivers 175N-175A) with slew rate control. For ease of illustration, the example pass gate driver 200 is described herein with respect to the example digital LDO regulator 115 shown in FIG. 1A and is shown in conjunction with an example pass gate switch M 145 analogous to those of FIG. 1B. The pass gate driver 200 includes a first inverter 230 having transistors MP1 and MN1, a second inverter 240, and transistors MP2-5 and MN2-3. MN1-3 are NMOS, and MP1-5 are PMOS in this example. In other examples, one or more of MN1-3 are PMOS or BJTs, and/or one or more of MP1-5 are NMOS or BJTs. The transistor MN1 is chosen to have substantially the same characteristics as M 145, such as the threshold voltage, geometry, rotation, biasing, and the like.

In inverter 230, the source terminal of MP1 is configured to receive a supply voltage Vdd 205, which in some implementations is a boosted voltage provided by a charge pump. The drain terminal of MP1 is coupled to a node B, to which the drain terminal of MN1 is also coupled. The source terminal of MN1 is coupled to the regulated output voltage node Vreg 195. The gate terminals of MP1 and MN1 are coupled together and to a node A, to which the gate terminal of M 145 is also coupled. The voltage on node A is the gate voltage Vg 250 for M 145. The voltage Vinv 260 on node B is provided to the input of the second inverter 240, and the output of the inverter 240 is provided to the gate terminal of MP4.

The source terminal of MP3 is configured to the receive the supply voltage Vdd 205, and the drain terminal of MP3 is coupled to the source terminal of MP2. The gate terminal of MP3 is configured to receive the control signal CTL 165 from the digital loop filter 160 shown in FIG. 1B. The drain terminal of MP2 is coupled to node A, and the gate terminal of MP2 is configured to receive a low biasing voltage Vbias_low 210 such that MP2 remains turned on. The drain terminal of MN2 is coupled to node A, and the source terminal of MN2 is coupled to the drain terminal of MN3. The gate terminal of MN2 is configured to receive a high biasing voltage Vbias_high 215 such that MN2 remains turned on. The drain terminal of MN3 is coupled to Vreg 195, and the gate terminal of MN3 is configured to receive the control signal CTL 165.

The source terminal of MP4 is coupled between the drain terminal of MP3 and the source terminal of MP2, and the drain terminal of MP4 is coupled to the source terminal of MP5. The drain terminal of MP5 is coupled to node A, and the gate terminal of MP5 is configured to receive the low biasing voltage Vbias_low 210. The control signal CTL 165 indicates whether the pass gate switch M 145 is to be turned on or off. In some examples, control signal CTL 165 is active low with respect to the pass gate switch M 145. In response to CTL 165 indicating the switch M 145 is to be turned on, MN3 is turned off and acts as an open switch, disconnecting node A and the gate terminal of M 145 from Vreg 195 via MN2. MP3 is turned on and acts as a closed switch, connecting node A and the gate terminal of M 145 to Vdd 205 via MP2.

In response to CTL 165 indicating the switch M 145 is to be turned off, MN3 is turned on and acts as a closed switch, coupling node A and the gate terminal of M 145 to Vreg 195 via MN2. MP3 is turned off and acts as an open switch, disconnecting node A and the gate terminal of M 145 from Vdd 205 via MP2. The high-resistance path of MN2 and MN3 ensures a slow decrease in the voltage of Vg 250, such that strong transients do not occur in Ipass 270. The transistors MP2 and MN2 have width-to-length ratios less than 1 and act as resistors, reducing the slewing rate. In addition, MP2 and MN2 remain turned on, reducing charge injection at node A.

MN1 acts as a detector for the pass gate transistor M 145. While M 145 is turned on but not significantly conductive (that is, Vg 250 is less than the threshold voltage of M 145), the voltage Vinv 260 on node B is logic high, such that the output of inverter 240 is logic low. MP4 is turned on and acts as a closed switch, such that current flows through the low-resistance path of MP3, MP4, and MP5 to increase Vg 250 on node A. As MN1 and M 145 become significantly conductive (that is, Vg 250 is greater than the threshold voltage of M 145), the voltage Vinv 260 on node B is logic low, such that the output of inverter 240 is logic high. MP4 is turned off and acts as an open switch, such that current flows through the high-resistance path of MP3 and MP2 to increase Vg 250 on node A.

The low-resistance path through MP3, MP4, and MP5 allows Vg 250 to quickly increase to the threshold voltage of M 145 and reduces the "dead time" before pass gate switch M 145 is turned on. The high-resistance path through MP3 and MP2 ensures a slow ramp in Vg 250 once it reaches the threshold voltage of M 145, preventing strong transients in the current Ipass 270 through the switch M 145. FIG. 3 shows waveforms 300 of signals in the pass gate driver 200 shown in FIG. 2, including the control signal CTL 165, the gate voltage Vg 250 on node A, the voltage Vinv 260 on node B, and the current Ipass 270 through the pass gate switch M 145.

The control signal CTL 165 transitions from logic high to logic low at time t0, indicating that the pass gate transistor M 145 is to be turned on. Between time t0 and time t1, the gate voltage Vg 250 is charged from ground to the threshold voltage of transistor M 145 through the low-resistance path MP3, MP4, and MP5. The voltage Vinv 260 is logic high for most of the period between t0 and t1, until as Vg 250 approaches the threshold voltage, Vinv 260 decreases to logic low at time t1, transitioning the pass gate driver 200 from the low-resistance path to the high-resistance path of MP3 and MP2. After time t1, Vg 250 increases slowly, preventing strong transients in the current Ipass 270 through the pass gate transistor M 145. The current Ipass 270 increases slowly throughout time t0, t1, and after, indicating a quick but smooth turn-on of transistor M 145.

Figure 4:
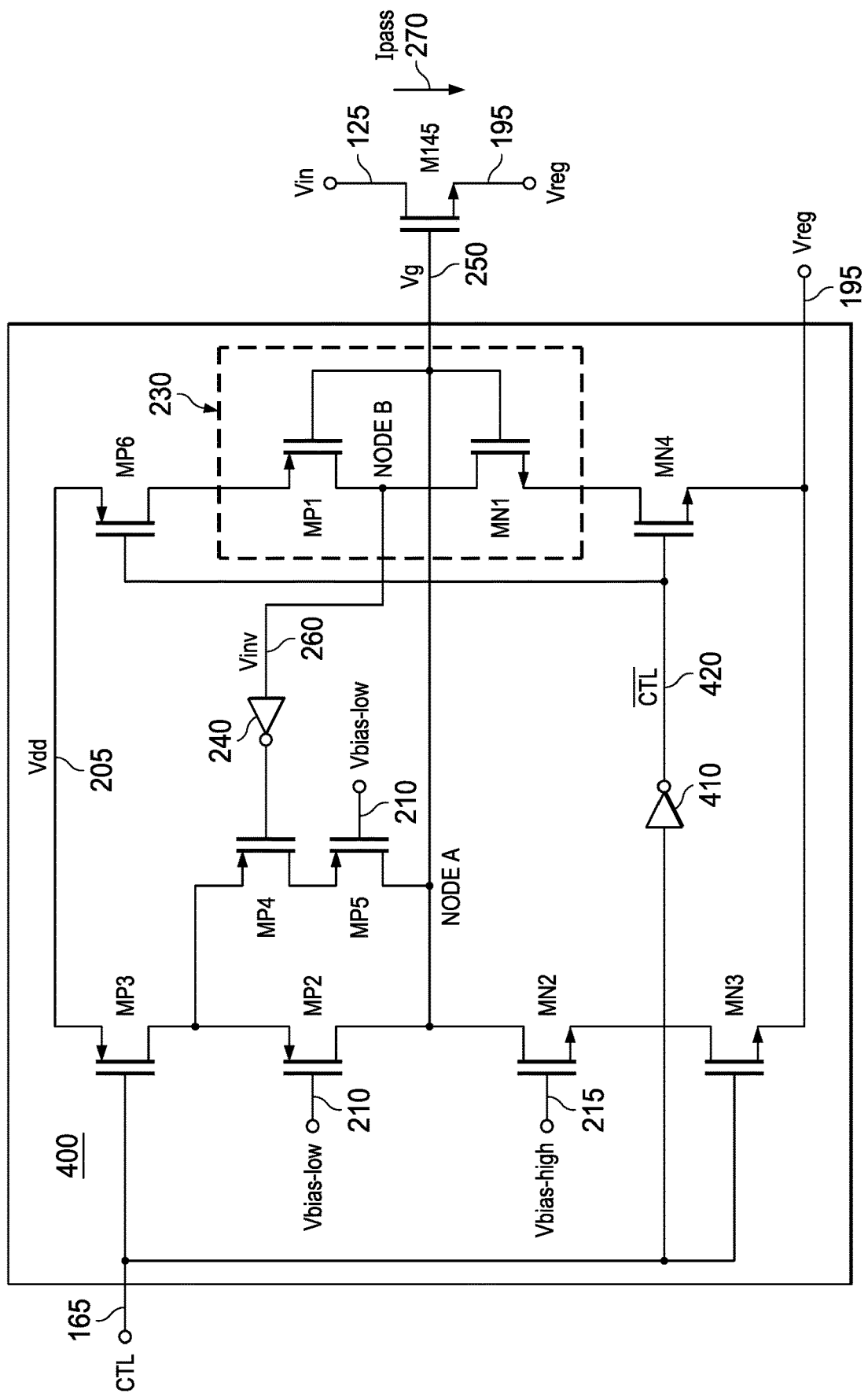
FIG. 4 shows an example pass gate driver with slew rate control and reduced cross current.

FIG. 4 shows an example pass gate driver 400 with slew rate control and reduced cross current. The example pass gate driver 400 is similar to the pass gate driver 200 shown in FIG. 2, but also includes inverter 410 and transistors MP6 and MN4. The transistor MP6 is a PMOS, and transistor MN4 is an NMOS, in this example. In other examples, MP6 is an NMOS or a BJT, and/or MN4 is a PMOS or a BJT. The source terminal of MP6 is configured to receive the supply voltage Vdd 205, which is a boosted voltage from a charge pump. The drain terminal of MP6 is coupled to the source terminal of MP1 in inverter 230. The drain terminal of MN4 is coupled to the source terminal of MN1, and the source terminal of MN4 is coupled to Vreg 195.

The inverter 410 receives the control signal CTL 165 and outputs the inverted control signal $\overline{CTL}$ 420 to the gate terminals of MP6 and MN4. While CTL 165 indicates that transistor M 145 is to be turned on, the control signal $\overline{CTL}$ 420 causes MN4 to be turned on and act as a closed switch between the transistor MN1 and Vreg 195 and MP6 to be turned off and act as an open switch between the supply voltage node Vdd 205 and the source terminal of MP6. During the fast transition between time t0 and t1 described in FIG. 3, the transistors MP6 and MN4 dictate the behavior of the inverter 230, and during the slow transition after time t1, the transistors MP1 and MN1 dictate the behavior of the inverter 230. After the transition, either MN4 or MP6 is immediately turned on, and node A is not yet charged to Vdd 205 or discharged to Vreg 195.

While CTL 165 transitions from logic high to logic low, MN4 is turned on, and MN1 is not yet conductive. MP1 is still conductive, and MP6 turns off immediately, preventing current flow from the supply voltage rail Vdd 205. Node A is charged quickly, primarily through the low-resistance path comprising MP3, MP4, and MP5 and partially through the high-resistance path comprising MP3 and MP2, until MN1 turns on. During this transition, node B is not driven directly and is held at a voltage approximately equal to the supply voltage Vdd 205 due to parasitic capacitances. As MN1 starts to turn on, node B discharges, turning off MP4 via inverter 240. The high-resistance path comprising MP3 and MP2 continues to charge node A. This also turns MP1 off.

While CTL 165 transitions from logic low to logic high, MP6 is turned on, and MN4 is turned off. MP1 and MP3 are turned off, and MN1 and MN3 are turned on. During the transition, node B is not driven directly and is held at a voltage approximately equal to Vreg 195 due to parasitic capacitances. Node A is discharged through MN2 and MN3. As MP1 becomes conductive, node B is charged via MP1 and MP6 and turns on MP4, which has no effect since MP3 is turned off at the beginning of the transition. The transistors MP6 and MN4 reduce the cross current through inverter 230, reducing the overall current draw from the charge pump providing the boosted supply voltage Vdd 205.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A driver circuit, comprising:
    a first transistor having a first control terminal coupled to an input node, a first current terminal coupled to a supply voltage rail, and a second current terminal;
    a second transistor having a second control terminal configured to receive a first biasing voltage, a third current terminal coupled to the second current terminal, and a fourth current terminal coupled to a first output node;
    a third transistor having a third control terminal configured to receive a second biasing voltage, a fifth current terminal coupled to the first output node, a sixth current terminal;
    a fourth transistor having a fourth control terminal coupled to the input node, a seventh current terminal coupled to the sixth current terminal, and an eighth current terminal coupled to a second output node;
    a fifth transistor having a fifth control terminal, a ninth current terminal coupled to the second and third current terminals, and a tenth current terminal;
    a sixth transistor having a sixth control terminal configured to receive the first biasing voltage, an eleventh current terminal coupled to the tenth current terminal, and a twelfth current terminal coupled to the first output node;
    a first inverter, comprising:
        a seventh transistor having a seventh control terminal coupled to the first output node, a thirteenth current terminal coupled to the supply voltage rail, and a fourteenth current terminal; and
        an eighth transistor having an eighth control terminal coupled to the first output node, a fifteenth current terminal coupled to the fourteenth current terminal, and a sixteenth current terminal coupled to the second output node; and
    a second inverter having an input coupled to the fourteenth and fifteenth current terminals and an output coupled to the fifth control terminal.

2. The driver circuit of claim 1, wherein the first output node is configured to be coupled to a control terminal of a pass gate transistor, and wherein characteristics of the eighth transistor match characteristics of the pass gate transistor.

3. The driver circuit of claim 1, wherein a width-to-length ratio of the second transistor is less than one, and wherein a width-to-length ratio of the third transistor is less than one.

4. The driver circuit of claim 3, wherein the first, fifth, and sixth transistors comprise a low-resistance charging path from the supply voltage rail to the first output node, and wherein the first and second transistors comprise a high-resistance charging path from the supply voltage rail to the first output node.

5. The driver circuit of claim 1, wherein the first, second, fifth, sixth, and seventh transistors comprise p-type metal oxide semiconductor field-effect transistors (MOSFETs), and wherein the third, fourth, and eighth transistors comprise n-type MOSFETs.

6. The driver circuit of claim 5, wherein the first biasing voltage is configured to keep the second and sixth transistors turned on.

7. The driver circuit of claim 5, wherein the second biasing voltage is configured to keep the third transistor turned on.

8. The driver circuit of claim 1, further comprising:
    a third inverter having an input coupled to the input node and an output;
    a ninth transistor coupled between the supply voltage rail and the thirteenth current terminal and having a ninth control terminal coupled to the output of the third inverter; and
    a tenth transistor coupled between the sixteenth current terminal and the second output node and having a tenth control terminal coupled to the output of the third inverter.

9. A circuit, comprising:
    a first transistor coupled to a supply voltage rail and having a first control terminal coupled to an input node;
    a second transistor coupled between the first transistor and a first output node, the second transistor having a second control terminal configured to receive a first biasing voltage;
    a third transistor coupled to the first output node and having a third control terminal configured to receive a second biasing voltage;
    a fourth transistor coupled between the third transistor and a second output node, the fourth transistor having a fourth control terminal coupled to the input node;
    a fifth transistor coupled to the first and second transistors and having a fifth control terminal;
    a sixth transistor coupled between the fifth transistor and the first output node, the sixth transistor having a sixth control terminal configured to receive the first biasing voltage;
    a first inverter, comprising:
        a seventh transistor coupled to the supply voltage rail and having a seventh control terminal coupled to the first output node; and an eighth transistor coupled between the seventh transistor and the second output node, the eighth transistor having an eighth control terminal coupled to the first output node; and a second inverter coupled to the seventh and eighth transistors and to the fifth control terminal.

10. The circuit of claim 9, wherein the first output node is configured to be coupled to a control terminal of a pass gate transistor, and wherein characteristics of the eighth transistor match characteristics of the pass gate transistor.

11. The circuit of claim 10, further comprising:
the pass gate transistor coupled between an input voltage and the second output node;
a capacitor coupled between the second output node and a ground node;
an analog-to-digital converter (ADC) having an input coupled to the second output node and an output; and
a digital filter circuit having an input coupled to the output of the ADC and an output coupled to the input node.

12. The circuit of claim 9, wherein a width-to-length ratio of the second transistor is less than one, and wherein a width-to-length ratio of the third transistor is less than one.

13. The circuit of claim 12, wherein the first, fifth, and sixth transistors comprise a low-resistance charging path from the supply voltage rail to the first output node, and wherein the first and second transistors comprise a high-resistance charging path from the supply voltage rail to the first output node.

14. The circuit of claim 9, wherein the first, second, fifth, sixth, and seventh transistors comprise p-type metal oxide semiconductor field-effect transistors (MOSFETs), and wherein the third, fourth, and eighth transistors comprise n-type MOSFETs.

15. The circuit of claim 14, wherein the first biasing voltage is configured to keep the second and sixth transistors turned on, and wherein the second biasing voltage is configured to keep the third transistor turned on.

16. The circuit of claim 9, further comprising:
a third inverter having an input coupled to the input node and an output;
a ninth transistor coupled between the supply voltage rail and the seventh transistor, the ninth transistor having a ninth control terminal coupled to the output of the third inverter; and
a tenth transistor coupled between the eighth transistor and the second output node, the tenth transistor having a tenth control terminal coupled to the output of the third inverter.

\* \* \* \* \*